June 13, 1933.   A. S. MANCIB   1,914,270

VALVE

Filed Jan. 10, 1931

Inventor,
Alvin S. Mancib,
by Roberts Cushman Woodbury
Attys.

Patented June 13, 1933

1,914,270

UNITED STATES PATENT OFFICE

ALVIN S. MANCIB, OF SOMERVILLE, MASSACHUSETTS, ASSIGNOR TO COMSTOCK & WESCOTT, INC., OF BOSTON, MASSACHUSETTS, A CORPORATION OF MASSACHUSETTS

VALVE

Application filed January 10, 1931. Serial No. 507,843.

This invention relates to an improved valve with heat responsive control means therefor, whereby the valve may be maintained in an opened position under certain temperature conditions and will automatically close in response to a predetermined temperature condition.

In accordance with this invention, I provide a valve which is urged toward a seat by yieldable means such as a spring but which is normally locked in an open position, i. e., in spaced relation to its seat, by a heat responsive element, the element being arranged so that it will release the valve in response to a predetermined temperature condition and permit the valve to be closed by the spring, thereby interrupting fluid flow through the valve housing. Preferably the valve is so arranged that it will not open until it is manually reset, thus providing an arrangement which necessitates personal attention to the apparatus whenever the operating temperature reaches the critical temperature which causes the valve closing. A valve of this character is particularly advantageous when employed in the fuel supply line or duct of a burner employing a mixture of a combustible fluid and air as, for example, a gas or oil burner; and a valve of this character is illustrated, for example, in a control arrangement for a heat exchange or refrigerating system in the copending application of Lyman F. Whitney, Serial No. 512,405, filed January 30, 1931.

Referring to the accompanying drawing.

Figure 1:
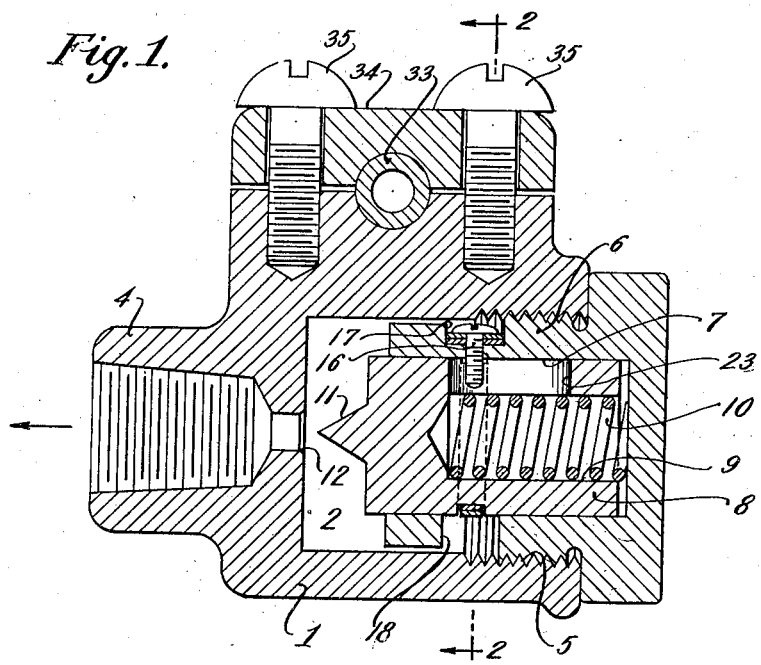
Fig. 1 is a sectional view of a valve assembly illustrating the principles of the present invention.
Figure 2:
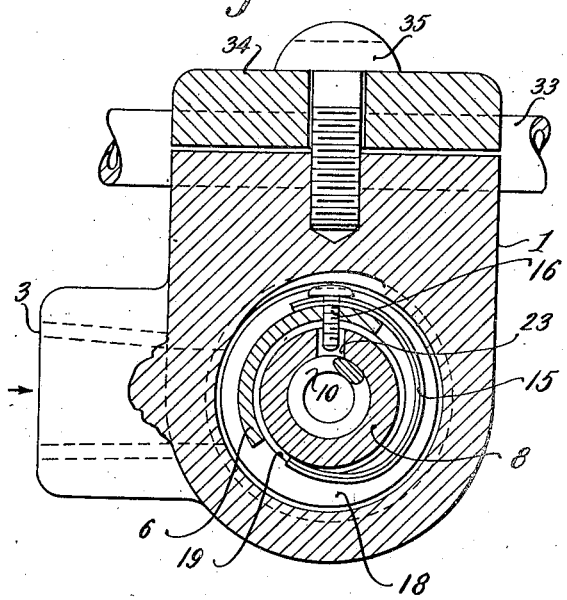
Fig. 2 is a section on line 2—2 of Fig. 1.
Figure 3:
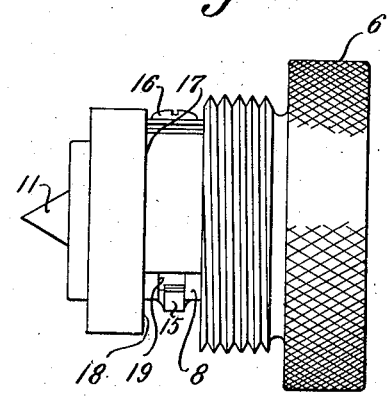
Fig. 3 is a perspective view of the valve guide and a portion of the valve, the locking means therefor and related parts.

Referring to the accompanying drawing, and first more particularly to Figs. 1 and 2 thereof, a valve assembly constructed in accordance with the present invention may comprise a housing, designated in general by the numeral 1, which may include a fluid chamber 2 having fluid inlet and outlet connections 3 and 4 in the form of internally threaded bosses which are adapted to be engaged with connections to fluid ducts. The chamber 2 preferably is of substantially cylindrical form and has an open end portion which is internally threaded, as designated by numeral 5, Fig. 1. A valve guide 6 preferably is in threaded engagement with this portion of the chamber and has an outer knurled head, whereby the guide may readily be screwed into or removed from the chamber. The guide 6 preferably is provided with an internal, cylindrical recess 7 in which the substantially cylindrical body portion 8 of the valve is slidably mounted. The valve body portion 8 is provided with a cylindrical bore 9 to receive a coil spring 10 and with a conical extension 11 that comprises the valve proper. As shown, the spring 10 preferably engages the end wall of the cylindrical bore 9 and engages the end wall of the recess 7 provided in the valve guide, thus tending to urge the valve 11 toward the fluid outlet 4. Preferably the inner end of the fuel outlet passage is provided with a frusto-conical form, thus affording a seat 12 to engage the valve 11.

Figure 4:
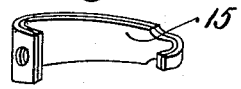
Fig. 4 is a perspective view of the heat sensitive locking element.

In order to hold the valve in its opened position, I provide a substantially C-shaped, temperature sensitive, bimetallic element 15, (Fig. 4) one end of which is secured by a screw 16 in a groove 17 upon the outer circumferential portion of the guide 6, Figs. 1 and 2. Preferably the guide 6 is provided with a substantially semi-circular slot 18 aligned with and forming a continuation of the groove 17. Under normal temperature conditions, the free end of the substantially segmental locking member 15 extends inwardly through the slot 18 and into circumferential groove 19 in the body 8 of the valve, thereby locking the same against movement toward the seat 12. A longitudinally disposed slot 23 may be provided in the valve body 8 to accommodate the inner end of screw 16 and yet to permit the ready movement of the valve when the thermostatic locking element releases the same.

A valve assembly of this character may be arranged at any suitable point in a fluid duct where temperature conditions may vary so that it is desirable at a certain predetermined critical temperature to have the further flow of fluid interrupted; for example, such a valve assembly may be arranged in a duct connected to a burner which is associated with a boiler and may be disposed adjoining a duct supplying liquid to the boiler to be vaporized as, for example, shown in the copending application of Lyman F. Whitney, identified above. Thus, as shown in the accompanying drawing, the duct 33, which is clamped in contact with housing 1 by a plate 34 and screws 35, may normally receive fluid which tends to maintain the housing 1 at a certain temperature, but an inordinate change in the temperature of the fluid in duct 33 would cause a corresponding change in the temperature of the housing 1 and hence of the temperature responsive element 15. If the temperature of the latter reaches a certain point, it will be distorted so that its free end is moved out of engagement with the groove 19 in the valve body 8, and accordingly the spring 10 will move the valve 11 into engagement with the seat 12, thus interrupting fluid flow through the valve housing.

A valve of this character may also be advantageously employed adjoining the air inlet of a fluid burner and be arranged so that a marked increase of the temperature of this part of the burner will result in the interruption of fuel flow thereto, thus, for example, shutting off the flow of fuel if the burner should backfire. It is evident that when the locking means releases the valve a subsequent resumption of normal temperature conditions will not result in reopening of the valve, but the valve will be held in closed condition by the spring 10 until the guide 6 is removed from the housing 1, whereupon the valve body 8 and spring 10 are also removed due to the engagement of the inner end of screw 16 with the slot 23. Thereupon the valve body 8 may be manually returned to its normal position with the temperature responsive element 15 again engaging in the groove 19 and thus again holding the valve in its open position as well as retaining the spring 10 in its compressed condition.

It is thus evident that I have provided a simple, inexpensive and compact valve assembly which will automatically be effective to interrupt the flow of fluid in response to abnormal temperature conditions and which will require personal attention, and manual resetting before it may again be adjusted to its normal operative condition.

It should be understood that the present disclosure is for the purpose of illustration only and that this invention includes all modifications and equivalents which fall within the scope of the appended claims.

I claim:

1. A device of the class described, comprising a housing having a fluid inlet and a fluid outlet, a valve movable into engagement with a seat, and temperature responsive locking means normally holding the valve in a fixed open position in spaced relation to the seat, the locking means releasing the valve in response to a predetermined temperature, and the released valve then being automatically movable into engagement with the seat, and a manually removable closure forming a part of the housing, said valve and locking means being removable with the closure, whereby the valve may be manually reset in its open position.

2. A device of the class described, comprising a housing having a fluid inlet and a fluid outlet, a valve movable into engagement with a seat, and temperature responsive locking means normally holding the valve in a fixed open position in spaced relation to the seat, the locking means releasing the valve in response to a predetermined temperature, and the released valve then being automatically movable into engagement with the seat, a valve guide forming a part of the housing wall and being removable therefrom, the locking means and valve being removable with the guide, whereby the valve may be removed and manually reset in its open position.

3. A device of the class described, comprising a housing having a fluid inlet and a fluid outlet, a valve guide, a valve having a portion in slidable engagement with the guide and a portion movable into engagement with a valve seat, a temperature responsive element having an end portion supported in fixed relation to the housing and a locking portion engaging in a recess in the valve to hold the latter in open position, said locking portion being automatically movable out of said recess in response to a change in temperature, the valve thereupon being automatically movable into engagement with the seat.

4. A device of the class described, comprising a housing having a fluid inlet and a fluid outlet, a valve guide, a valve having a portion in slidable engagement with the guide and a portion movable into engagement with a valve seat, a temperature responsive element having an end portion supported in fixed relation to the housing and a locking portion engaging in a recess in the valve to hold the latter in open position, said locking portion being automatically movable out of said recess in response to a change in temperature, the valve thereupon being automatically movable into engagement with the seat, said guide having a screw-threaded engagement with the housing and being removable therefrom to afford acces to the valve and temperature responsive element to permit resetting of the valve.

5. A device of the class described, comprising a housing having a fluid inlet and a fluid outlet, a guide in threaded engagement with the housing and readily removable therefrom, the guide having a cylindrical recess, a valve slidably mounted in said recess and movable into engagement with a valve seat provided by the housing, a spring within the guide urging the valve toward the seat, a temperature responsive locking element carried by the guide and having an end portion normally engaging in a recess in the valve to hold the latter open, said element being distortable in response to temperature change to release the valve so that the spring moves the valve to closed position.

6. A device of the class described, comprising a housing having a fluid inlet and a fluid outlet, a guide in threaded engagement with the housing and readily removable therefrom, the guide having a cylindrical recess, a valve slidably mounted in said recess and movable into engagement with a valve seat provided by the housing, a spring within the guide urging the valve toward the seat, a temperature responsive locking element carried by the guide and having an end portion normally engaging in a recess in the valve to hold the latter open, said element being distortable in response to temperature change to release the valve so that the spring moves the valve to closed position, said valve, element and guide being removable together from the housing to permit manual resetting.

7. A device of the class described, comprising a housing having a fluid inlet and a fluid outlet, a guide in threaded engagement with the housing and readily removable therefrom, the guide having a cylindrical recess, a valve slidably mounted in said recess and movable into engagement with a valve seat provided by the housing, a spring within the guide urging the valve toward the seat, a temperature responsive locking element carried by the guide and having an end portion normally engaging in a recess in the valve to hold the latter open, said element being distortable in response to temperature change to release the valve so that the spring moves the valve to closed position, said element being of substantially segmental form and having an end portion secured to the guide, its opposite end engaging in the recess in the valve.

8. A device of the class described, comprising a housing having a fluid inlet and a fluid outlet, a guide in threaded engagement with the housing and readily removable therefrom, the guide having a cylindrical recess, a valve slidably mounted in said recess and movable into engagement with a valve seat provided by the housing, a spring within the guide urging the valve toward the seat, a temperature responsive locking element carried by the guide and having an end portion normally engaging in a recess in the valve to hold the latter open, said element being distortable in response to temperature change to release the valve so that the spring moves the valve to closed position, said element being of substantially segmental form and having an end portion secured to the guide, its opposite end engaging in the recess in the valve, a screw securing one end of said element to the guide, the opposite end of the element engaging in the recess in the valve, and a longitudinal recess in the valve into which the end of the screw projects, whereby said valve, element and guide may be removed as a unit to facilitate resetting.

9. A device of the class described, comprising a housing having a fluid inlet and a fluid outlet, a guide in threaded engagement with the housing and readily removable therefrom, the guide having a cylindrical recess, a valve slidably mounted in said recess and movable into engagement with a valve seat provided by the housing, a spring within the guide urging the valve toward the seat, said guide having a segmental groove, a substantially segmental, heat responsive element having an end secured within said groove, the other end of said element extending through an opening in said guide and normally engaging in a recess in said valve to hold the latter open, said element being distortable in response to temperature change to release the valve so that the spring moves the valve to closed position.

10. A device of the class described, comprising a housing having a fluid inlet and a fluid outlet, a guide in threaded engagement with the housing and readily removable therefrom, the guide having a cylindrical recess, a valve slidably mounted in said recess and movable into engagement with a valve seat provided by the housing, a spring within the guide urging the valve toward the seat, said guide having a segmental groove, a substantially segmental, heat responsive element having an end secured within said groove, the other end of said element extending through an opening in said guide and normally engaging in a recess in said valve to hold the latter open, said element being distortable in response to temperature change to release the valve so that the spring moves the valve to closed position, a fastening element holding the end of said heat-responsive element in the groove and projecting into a longitudinal slot in the valve, whereby the latter may slide in the guide, but may be removed as a unit with the guide for resetting.

11. A device of the class described comprising a housing having a fluid inlet and a fluid outlet, a valve movable into engagement with a seat within the housing, a part fixed to the valve, a locking element distortable in response to temperature changes and normally engaging in a recess in the said part to hold the valve in a fixed open position in spaced relation to the seat, the locking element releasing the valve in response to a predetermined temperature and a removable closure carrying said locking element and when removed affording access to the locking element, valve and part fixed thereto so that the valve may be manually moved to a position wherein the locking element is reengageable with said recessed part whereby resetting of the valve may be effective.

12. A device of the class described comprising a housing having a fluid inlet and a fluid outlet, a valve movable into engagement with a seat in the housing, a part integral with the valve, a locking element distortable in response to temperature changes, said element normally engaging in a recess in the part to hold the valve in a fixed open position in spaced relation to the seat, the locking element releasing the valve in response to a predetermined temperature and the released valve then being automatically movable into engagement with the seat, a valve guide carrying said locking element and forming a part of the housing wall and being removable therefrom as a unit with the locking element, the valve and part integral therewith, so that the valve may be manually reset to its open position wherein the locking element may reengage the recess in said part.

Signed by me at Boston, Massachusetts, this 9th day of January, 1931.

ALVIN S. MANCIB.